July 30, 1935.  F. McNEILL  2,009,630
LIQUID LEVEL INDICATOR
Filed June 2, 1932   2 Sheets-Sheet 1
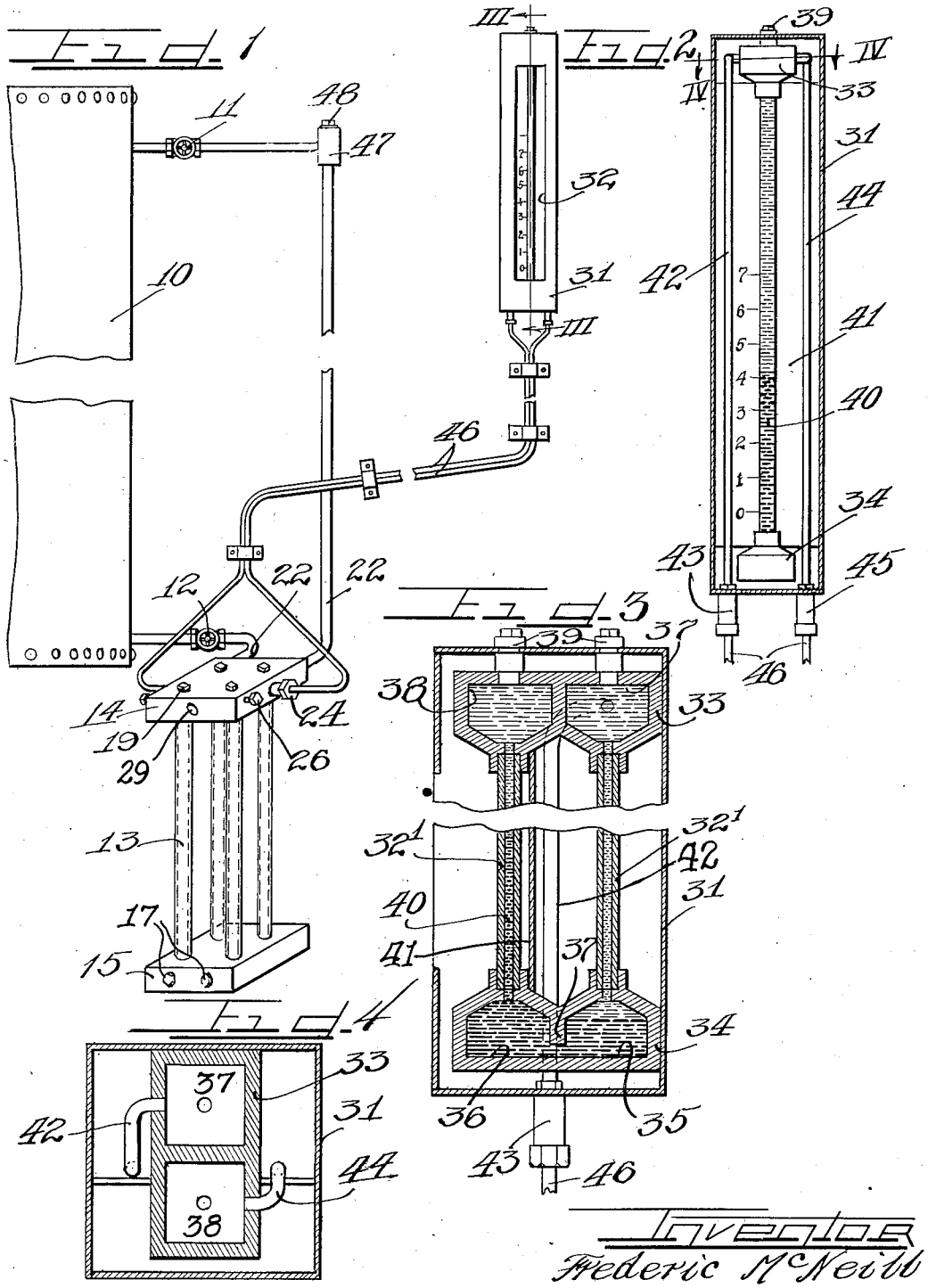
Inventor
Frederic McNeill
by Charles H. Hill Attys.

July 30, 1935.  F. McNEILL  2,009,630
LIQUID LEVEL INDICATOR
Filed June 2, 1932  2 Sheets-Sheet 2
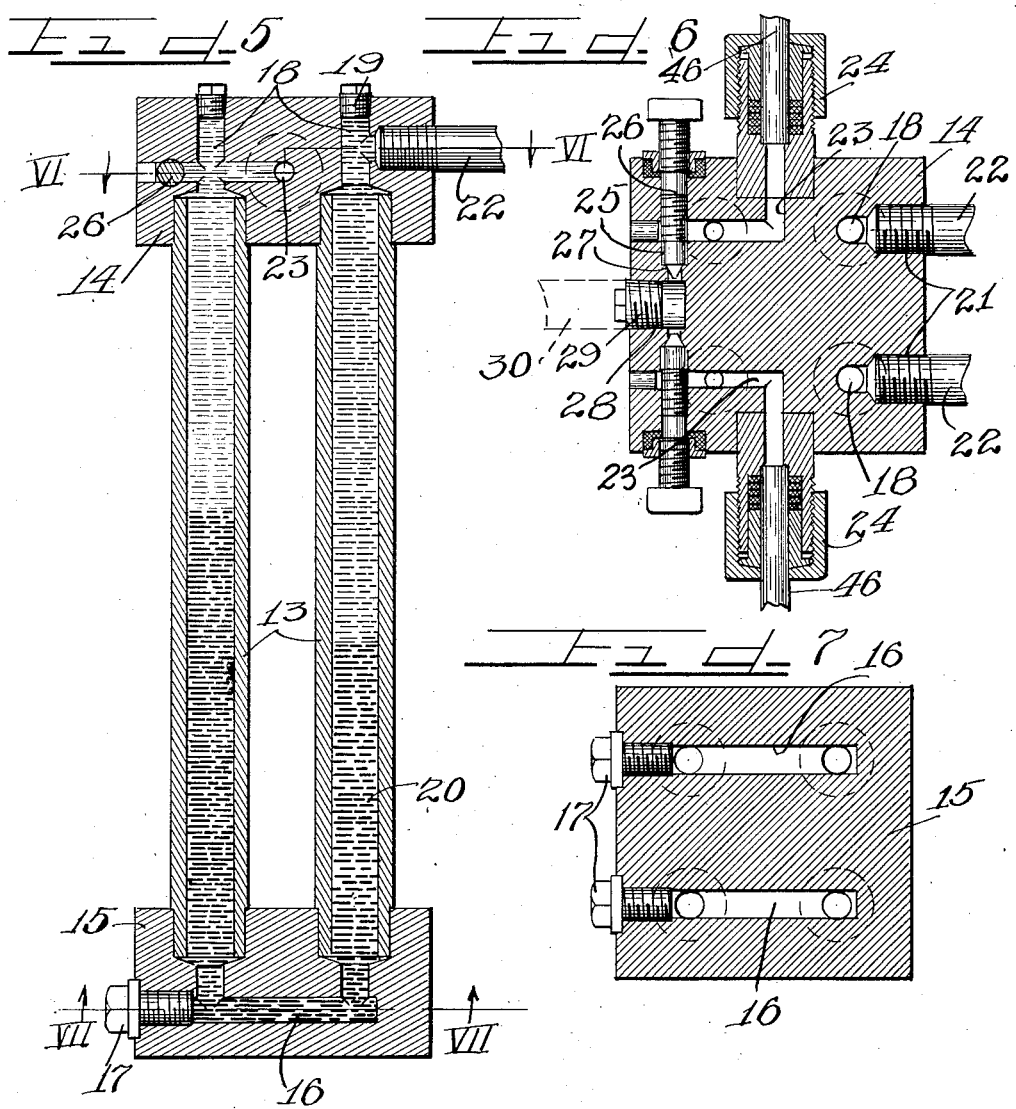

Patented July 30, 1935

2,009,630

UNITED STATES PATENT OFFICE 2,009,630

LIQUID LEVEL INDICATOR

Frederic McNeill, Wilmette, Ill., assignor to Thomas W. McNeill, doing business as Boiler Room Improvement Co., Chicago, Ill.

Application June 2, 1932, Serial No. 614,958

8 Claims. (Cl. 73—54)

This invention relates to improvements in liquid level indicators and is particularly concerned with indicators for showing the level of liquid in boilers and the like at a point remote from the boiler.

The present invention is also an improvement over the liquid level indicator disclosed in my Patent No. 1,699,075 dated June 15, 1929, Patent No. 1,733,616 dated October 29, 1929, and Patent No. 1,944,943 dated Jan. 30, 1934.

The present invention contemplates the provision of a liquid level indicator for indicating the level of a liquid in a container more reliably and accurately than such devices as heretofore constructed, the indicator being disposed above, below, or in proximity to the actual level of the liquid in the container and at a remote or contiguous point thereto.

This invention further seeks to provide a liquid level indicator of the character described herein, which utilizes a plurality of non-miscible liquids arranged in such a manner as to secure a substantially balanced system in which the accuracy of the liquid level indications are substantially unaffected by changes in temperature.

Another object of the present invention is to provide a liquid level indicator of such construction and design that it may be easily installed, and in which the likelihood of introducing errors, during the installation and connection of the various elements, is reduced to a minimum.

It is also an object of the invention to provide a liquid level indicator which utilizes a plurality of liquids, and is constructed and designed to enable the introduction of these liquids thereinto in such a manner as to minimize the attainment of such conditions as would result in an inaccurate indication of the liquid level.

In accordance with the general features of this invention it is proposed to provide a liquid level indicator consisting of a mercury element having two U tubes entirely separated from each other and of sufficient length to support a column of lighter liquid, such as water or oil from one side of each tube to the required position of an indicating element which is remotely positioned from the mercury element. The indicating element is connected to the mercury element through a pair of tubes of uniform length. These tubes therefore will hold an equal amount of liquid so that any change of temperature will affect both tubes alike. Moreover, the indicating element is in the form of a U tube having legs of equal length, the tube being constructed of uniform material so that both legs will be affected similarly in response to changes of temperature.

Another feature of the invention resides in the provision of a valve arrangement in connection with the mercury element, which enables the connecting tube to be filled from a common source. A separate valve is provided whereby either tube may be connected and disconnected to the common source.

A further feature resides in the use of packed joints on the mercury element and the indicating element for receiving the ends of the interconnecting pipes or conduits. This feature has been found in actual practice to be particularly advantageous in that it enables continuous conduits or pipes to be utilized, thereby making it unnecessary to provide any special fittings or pipe connections which would tend to introduce errors in the indicated level of liquid.

Other objects and features of this invention will more fully appear from the following detail description taken in connection with the accompanying drawings which illustrate a single embodiment thereof, and in which Figure 1 is a fragmentary view in elevation showing a liquid level indicator embodying the features of the present invention, the indicator being connected to a liquid container;

Figure 2 is an enlarged elevation of the indicating element, the casing being in section to show the pipe connections within the casing;

Figure 3 is an enlarged fragmentary vertical sectional view through the indicating element, taken substantially on line III—III of Figure 1;

Figure 4 is an enlarged horizontal section through the indicating element, taken substantially on line IV—IV of Figure 2;

Figure 5 is an enlarged vertical sectional view through one of the U-tubes of the mercury element;

Figure 6 is an enlarged horizontal section through the head plate of the mercury element, showing the filling valve arrangement, taken substantially on line VI—VI of Figure 5; and Figure 7 is a similar view through the base plate of the mercury element, showing means for draining the U-tubes, taken substantially on line VII—VII of Figure 5.

As shown on the drawings:

In the illustrated embodiment of this invention, there is shown in Figure 1, a liquid level indicator which is connected to a container 10 having a liquid therein. In the present instance, I have chosen to show a liquid level indicator of the so-called proportional reading type, that is, a liquid level indicator in which the indicating element contains an indicating liquid which travels a predetermined ratio of the actual variations of the level of the liquid being indicated. It will of course be appreciated that the principles embodied in the present invention may with equal facility be utilized in a direct reading liquid level indicator.

In the proportional type of indicator, pipe connections are made to the tank 10 through valves 11 and 12, the latter valve being disposed at the minimum level to be indicated and the valve 11 being disposed at the maximum level to be indicated. The exact distance from center to center of these valves should be such as to give the proper proportional reading on the indicating element. In the direct reading type the indicating element is calibrated to read directly the distance between the valves 11 and 12.

The liquid level indicator in general comprises a mercury element which is connected with an indicating element. The mercury element is located adjacent the tank containing the liquid of which the level is to be indicated, and the indicating element is located at a point where it is desired to have the indicated level of liquid conveniently available at all times. In practice, the indicating element will ordinarily be remotely disposed relative to the mercury element.

The mercury element is constructed so as to form two U-tubes entirely separated from each other and of sufficient length to support a column of lighter liquid, such as water or oil from one side of each tube to the required position of the indicating element. I have found it desirable to construct the mercury element so that it may be easily handled and installed as a unit. In the present instance, four metallic tubes 13 are secured with their upper and lower ends respectively in a top plate 14 and bottom plate 15. The bottom plate is passaged as shown at 16 so as to interconnect each pair of tubes, and thus form two separate U-tubes. Each passageway 16 is extended to one side of the block and internally threaded for receiving a plug 17 which upon being removed enables the respective tubes to be drained. In the top plate, passageways 18 extend through the plate and are respectively in communication with the tubes 13, these passageways each being internally threaded at the top surface of the plate to receive a plug 19. The plugs 19 enable the tubes 13 to be easily filled with a liquid of relatively high specific gravity. For this purpose I have found that mercury shown at 20 is very admirably adapted. Communicating respectively with two of the passageways 18 are passageways 21—21 which are internally threaded for receiving the ends of pipes 22—22. The other end of each U-tube is in communication with a passageway 23 which terminates in a packing gland, generally indicated at 24, the two packing glands for the two U-tubes being laterally disposed on each side of the top plate at points substantially intermediate the other two sides of the plate.

The passageway 23 extends into a passageway 25 which is disposed at right angles thereto and internally threaded for receiving a needle valve 26 which cooperates with an internal shoulder 27 to control the communication of passageway 23 with an opening 28 which is internally threaded and fitted with a removable plug 29. Removal of this plug enables a pipe connection to be made to the passageway by means of a pipe 30 as shown in dotted lines in Figure 6 for a purpose which will be explained in detail later.

The indicating element consists of a housing 31 which is provided with an opening 32 on one side through which the indicating elements are visible. The indicating element comprises in effect a U-tube that is exactly uniform as regards the amount of liquid that would be held in either side. This tube is of uniform construction, in this instance, being of glass. It will therefore be appreciated, that any change in temperature will affect both legs of the U-tube in the same manner and will not affect the reading of the device as would be the case if one leg were, for example, of glass and the other a material having a different coefficient of expansion. For this purpose, two glass tubes 32' are vertically disposed with their ends secured respectively in an upper reservoir 33 and a lower reservoir 34.

The lower reservoir comprises two chambers 35 and 36 of corresponding size and shape, which are interconnected through a passage 37. The chamber 35 is in communication with one leg of the U-tube and the chamber 36 is in communication with the other leg of the U-tube.

The reservoir 33 at the top of the indicating element likewise comprises two chambers 37 and 38 which are also of corresponding size and shape. The chambers 37 and 38 are in communication with each of the legs of the U-tube. However, in this case the two chambers are not interconnected as in the case of the bottom reservoir. The upper and lower reservoirs are constructed of the same material and are preferably of metal. The foregoing construction provides an indicating instrument in which the legs of the U-tube are uniformly and similarly constructed, and equally affected by changes in temperature, with the result that the readings indicated will be very accurate. A filling plug 39 is provided at the top of each chamber 37 and 38 to enable filling of the U-tube with an indicating liquid as indicated at 40 for cooperation with one leg of the U-tube, a scale plate 41 is disposed behind the leg of the U-tube so as to be visible through the opening 32 of the casing and cooperate with this leg to indicate the level of liquid in the tank 10. Chamber 37 is connected through a pipe 42 to the bottom of the casing where a packing gland 43 is provided. The chamber 38 is similarly connected through a pipe 44 to the bottom of the casing where a packing gland 45 is provided.

The indicating element is connected to the mercury element through a pair of conduits or pipes 46—46, these pipes being connected at one end to the indicating element through the stuffing glands 43 and 45 and to the mercury element through the stuffing glands 24—24. The pipes 46 are preferably of uniform length so as to hold an equal amount of fluid and should be placed close together so that any change of temperature will affect in like manner the contents of the two pipes. It is also to be noted that the use of packing glands in connection with both the indicating and mercury elements, enables the connection of these elements to the pipes 46 without the necessity of having to use pipe fittings and other connecting devices which would have a tendency to introduce errors into the water level indication.

In connecting the mercury element to the tank 10, one of the pipes 22 is connected to the valve 12 and the other pipe 22 is connected through a capacity chamber 47 to the valve 11. The capacity chamber 47 is provided with a filling plug 48, the purpose of which will be later explained.

Having now described the construction of my improved liquid level indicator the filling process will now be described. With the valves 11 and 12 closed, the plugs 19 at the upper end of each leg of the U-tubes are removed. The plugs 39 at the upper ends of the legs of the U-tubes of the indicating element are likewise removed. Valves 26—26 in the mercury elements are closed. Each of the U-tubes of the mercury element may now be filled until approximately half full of mercury. The mercury should be introduced into the U-tubes through the passageways 18 which are adjacent the valves 26. Next, fill the tubes through passageways 18 which are adjacent the pipe connections 22, to overflowing with water or whatever fluid is being indicated in the tank. The plugs 19 for the passageways 18 into which the water has just been poured should now be replaced.

The plug 48 in the capacity chamber 47 is removed and the pipe 22 connected thereto is now filled with the same liquid up to a point where the liquid will overflow through valve 11 into the tank. This must be done very slowly to avoid trapping air in the pipe 22. Trapped air may be surged out easily by surging the mercury through the passageway 18 adjacent the valve 26 of the U-tube which is connected to the pipe 22 in communication with the capacity chamber 47 with a small round stick of wood. The plug 48 is now replaced and tightened up securely.

The black or colored liquid for the indicating element may now be introduced thereinto, this liquid being poured into the reservoirs 37 and 38 until the chambers 35 and 36 are filled.

Next, a light transparent oil such as kerosene is introduced into the chamber 37 until the indicating liquid rises in tube 40 to the point of maximum indication, then into chamber 38 until the indicating liquid recedes to the point of zero indication.

The plug 29 is removed and a pipe 30 connected to the mercury element. The pipe 30 may constitute a pressure system whereby a liquid may be forced into the mercury element. For this purpose I have found it desirable to use a portable filling cup which is constructed of glass or other transparent material which is provided with a removable plug to enable filling and is arranged with a nipple for connecting an air pump, this nipple being provided with a check valve so that when air pressure is pumped into the cup it is maintained for the purpose of forcing the desired liquid into the system. Suitable connections are also provided on the cup whereby it may be connected in the same manner as pipe 30 as shown in dotted lines in Figure 6.

Having connected the pressure system to the mercury element, and the valves 26 being closed, one of these valves is opened and kerosene forced into the U-tube connected thereto until the kerosene overflows from its passage 18 after which the plug 19 thereof is replaced. Kerosene is then forced up the tube 46 until the liquid overflows into chamber 37. This will be evidenced by a slight rise in the tube 40 of the indicating liquid. The valve 26 which was opened is now closed and the other valve 26 opened in like manner, whereupon the same process is followed in filling the other and remaining leg of the U-tube in the mercury element and pipe 46. As soon as liquid overflows into the chamber 38 there will be a slight lowering of the indicating liquid in the tube 40. The valve 26 is then closed.

The chambers 37 and 38 of the indicating element are now filled to overflowing with the kerosene oil and the plug 39 thereof replaced. Under these conditions the indicating fluid should stand below the zero point in the indicating glass. To overcome this condition the right hand valve 26 as viewed in Figure 1 is opened and sufficient oil is pumped into the mercury element to cause the indicating fluid to rise substantially one-quarter of the length of tube 40. The valve 26 is then closed and the other valve 26 is opened and sufficient oil forced into that side of the element to cause the indicating liquid to recede in the glass to exactly the point of zero indication. This valve is then closed and valves 11 and 12 opened. When this is done the indicating fluid will rise in tube 40 in proportion to the height of the liquid in the tank. If the indication is not now exactly correct, the valves 11 and 12 should be again closed and plug 48 of the capacity chamber 47 removed and additional water or whatever fluid is in the tank should be added until it overflows. The plug 47 is then replaced and the valves 11 and 12 again opened. It will now be found that the reading of the indicating element will be correct. The pressure system may now be disconnected from the mercury element and plug 29 replaced. The liquid level indicator may now be used continuously without further care or attention and will indicate accurately the height of liquid level in the tank 10.

In installations where the tank 10 is open to atmospheric pressure, the pipe 22 connected to the top of the tank through the valve 11, this pipe being in effect a balancing connection, may be dispensed with.

From the foregoing it will be apparent that this invention provides a liquid level indicator of such construction that it may be easily installed; in which there is little likelihood during installation of the introduction of errors into the system; which may be placed above or below the actual level of liquid to be indicated; and which is so balanced that the indicator is not appreciably affected by changes in temperature.

Now, it is of course to be understood that although I have described in detail the preferred embodiment of my invention, the invention is not to be thus limited but only insofar as defined by the scope and spirit of the appended claims.

I claim as my invention:

1. The combination with an indicating device of a trap comprising a pair of U-tubes of uniform length, means in communication with the ends of said tubes and arranged to enable the connection of conduits thereto, a pair of conduits of substantially uniform length connecting said means at one set of ends of said tubes with said device, a plurality of non-miscible liquids in said device, U-tubes and conduits, said means defining a passageway common to said set of ends, and valve means for controlling the connection of either of the ends of said set to said passageway.

2. The combination with an indicating device of a trap comprising a pair of U-tubes of uniform length, means in communication with the ends of said tubes and arranged to enable the connection of conduits thereto, a pair of conduits of substantially uniform length connecting said means at one set of ends of said tubes with said device, a plurality of non-miscible liquids in said device, U-tubes and conduits, said means defining a passageway common to said set of ends, and a valve disposed between said passageway and each end of said set.

3. The combination with an indicating device of a trap comprising a pair of U-tubes of uniform length, individual conduit connections associated with each of the ends of said tubes, a pair of conduits of substantially uniform length connecting one set of said tube ends with said device, means defining a passageway common to said pair of conduits, and a valve disposed between each of said conduits and the common passageway.

4. The combination with trap means adapted for connection to a fluid container of an indicating device comprising a pair of vertically disposed tubes, one of said tubes having a transparent portion, a reservoir connected to and common with the lower ends of said tubes, a pair of reservoirs respectively connected to the upper ends of said tubes, a pair of conduits of substantially uniform length connecting said latter reservoirs to said trap means, and a plurality of non-miscible liquids in said trap, conduits and device disposed with an interface in said transparent portion.

5. The combination with trap means adapted for connection to a fluid container of an indicating device comprising a pair of vertically disposed tubes of like material, said tubes being transparent, a reservoir connected to and common with the lower ends of said tubes, a pair of reservoirs respectively connected to the upper ends of said tubes, a pair of conduits of substantially uniform length connecting said latter reservoirs to said trap means, and a plurality of non-miscible liquids in said trap, conduits and device disposed with an interface in one of said tubes.

6. The combination with trap means adapted for connection to a fluid container of an indicating device comprising a pair of vertically disposed tubes, one of said tubes having a transparent portion, a reservoir connected to and common with the lower ends of said tubes, a pair of reservoirs respectively connected to the upper ends of said tubes, a pair of conduits of substantially uniform length connecting said latter reservoirs to said trap means, a plurality of non-miscible liquids in said trap, conduits and device disposed with an interface in said transparent portion, and scale means cooperatively associated with said interface.

7. The combination with an indicating device of a trap comprising a pair of U-tubes of uniform length, a plate member having the ends of said tubes anchored therein and defining a plurality of passageways, certain of said passageways respectively communicating with the ends of said tubes and each adapted to have a conduit connected thereto, a conduit connecting one end of each tube thru its associated passageway to said device, the other of said passageways being common to the ends of the tubes, which are so connected to the device, and adapted for connection to a pipe, means to normally close said pipe connection, a valve member on each side of said pipe connection to control said common passageway, and a plurality of non-miscible liquids in said device, U-tubes and connecting conduits.

8. The combination with an indicating device of a trap comprising a pair of U-tubes of substantially uniform length, means in communication with the ends of said tubes and arranged to enable the connection of conduits thereto, a pair of conduits of substantially uniform length connecting said means at one set of ends of said tubes with said device, a plurality of non-miscible liquids in said device, U-tubes and conduits, and means including valve parts operative to establish and disestablish communication between said one set of ends and a common conduit connection.

FREDERIC McNEILL.